D. W. Green,
Faucet.
No. 88,032.  Patented Mar. 23, 1869.
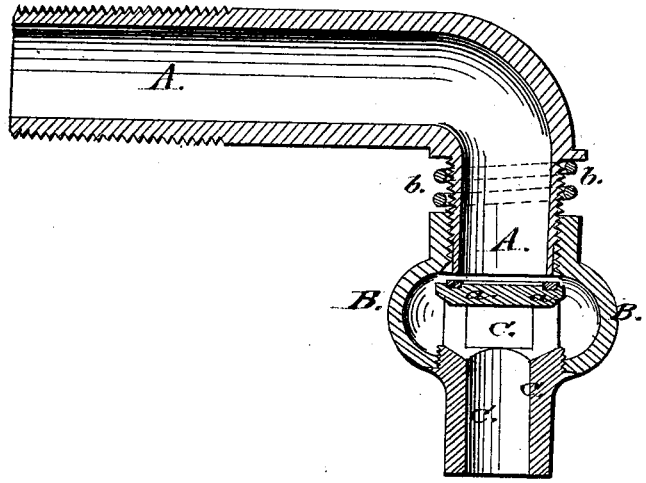
WITNESSES:
W. C. Ashkettle
Wm. A. Morgan
INVENTOR:
D. W. Green
per Munn & Co.
attorneys.

United States Patent Office.

DANIEL W. GREEN, OF PORTCHESTER, NEW YORK, ASSIGNOR TO WILLIAM BRUNDAGE, OF SAME PLACE.

*Letters Patent No. 88,032, dated March 23, 1869.*

IMPROVEMENT IN FAUCETS.

The Schedule referred to in these Letters Patent and making part of the same.

*To all whom it may concern:*

Be it known that I, DANIEL W. GREEN, of Portchester, in the county of Westchester, and State of New York, have invented a new and useful Improvement in Faucets; and I do hereby declare that the following is a full, clear, and exact description thereof, which will enable others skilled in the art to make and use the same, reference being had to the accompanying drawing, forming part of this specification, in which the drawing represents a longitudinal section of my improved faucet.

Similar letters of reference indicate like parts.

This invention relates to a new manner of arranging the valve in a faucet, and consists in using, instead of a spigot, as usual, an adjustable tube at the end of the faucet, which forms part, and is an extension of the body of the faucet, and which carries a valve that can be brought against a seat, formed at the end of the body of the faucet, so as to completely close the same.

The aforesaid extension-tube is screwed, or otherwise fastened in a sleeve, which is screwed to the end of the faucet, and by turning which the valve in the extension-tube can be brought nearer to or further from its seat, on the end of the faucet-body.

A, in the drawing, represents a tubular faucet, of ordinary or suitable shape, made of suitable metal, or other material.

Around its outer end is formed a male-screw thread, by means of which a sleeve, B, can be fastened to it, as shown.

In the sleeve B is held a short tube, C, which has a closed inner end, *a*, which closed end constitutes the valve.

The sides of the tube C are perforated within the sleeve B, as shown.

By turning the sleeve, the valve *a* can be forced against the end of the faucet A, so as to completely close the faucet, and, by more or less unscrewing the sleeve, the valve is brought more or less away from its seat, so as to open the end of the faucet, to allow the discharge of liquid therefrom.

It will be understood from the above, that the end of the faucet A constitutes the valve-seat.

A spring, *b*, interposed between a shoulder, *a*, on the faucet, and the inner end of the sleeve, may serve to keep the threads on B upon those of A, so as to keep the joint water-tight.

This invention recommends itself by its simplicity and compactness. It makes a faucet appear to better advantage, and prevents the necessity of the cumbersome projecting spigot.

Having thus described my invention,

I claim as new, and desire to secure by Letters Patent—

The faucet, constructed as described, of the chambered sleeve B, adapted to screw upon the end of the tube A, and carrying the slotted extension-tube C, whose top forms a valve, *a*, adapted to open or close the faucet, as the sleeve B is operated, as herein shown and described.

DANIEL W. GREEN.

Witnesses:
 WM. F. MCNAMARA,
 ALEX. F. ROBERTS.